US012612335B2

(12) United States Patent
Chang

(10) Patent No.: US 12,612,335 B2
(45) Date of Patent: Apr. 28, 2026

(54) CONCRETE FLOOR HARDENING AGENT

(71) Applicant: Jun An Shun Technology Co., Ltd.,
Tainan City (TW)

(72) Inventor: Cheng-Feng Chang, Kaohsiung City
(TW)

(73) Assignee: JUN AN SHUN TECHNOLOGY CO..
LTD., Tainan City (TW)

( * ) Notice: Subject to any disclaimer, the term of this
patent is extended or adjusted under 35
U.S.C. 154(b) by 392 days.

(21) Appl. No.: 18/364,029

(22) Filed: Aug. 2, 2023

(65) Prior Publication Data

US 2025/0042815 A1 Feb. 6, 2025

(51) Int. Cl.
| | |
|---|---|
| *C04B 22/00* | (2006.01) |
| *C04B 24/38* | (2006.01) |
| *C04B 24/42* | (2006.01) |
| *C04B 103/14* | (2006.01) |
| *C04B 103/40* | (2006.01) |
| *C04B 103/65* | (2006.01) |

(52) U.S. Cl.
CPC .......... *C04B 22/0093* (2013.01); *C04B 24/38*
(2013.01); *C04B 24/42* (2013.01); *C04B*
*2103/14* (2013.01); *C04B 2103/40* (2013.01);
*C04B 2103/65* (2013.01)

(58) Field of Classification Search
CPC ..... C04B 22/0093; C04B 24/38; C04B 24/42;
C04B 2103/14; C04B 2103/40; C04B
2103/65; C04B 28/26; C04B 2111/00482;
C04B 2111/60
See application file for complete search history.

(56) References Cited

FOREIGN PATENT DOCUMENTS

| | | | | |
|---|---|---|---|---|
| CN | 109777209 A | * | 5/2019 | |
| KR | 19990069337 A | * | 9/1999 | ....... G11C 29/50012 |

* cited by examiner

*Primary Examiner* — Anthony J Green
(74) *Attorney, Agent, or Firm* — MUNCY, GEISSLER,
OLDS & LOWE, P.C.

(57) ABSTRACT

A concrete floor hardening agent includes an aluminate, a
waterproofing agent, and water. The aluminate is selected
from the group consisting of potassium aluminate and
sodium aluminate, and is present in an amount ranging from
15 wt % to 65 wt % based on 100 wt % of the concrete floor
hardening agent. The waterproofing agent is selected from
the group consisting of potassium methyl silicate, sodium
methyl silicate, silicone oil, and siloxane, and is present in
an amount ranging from 5 wt % to 20 wt % based on 100 wt
% of the concrete floor hardening agent.

3 Claims, 7 Drawing Sheets

CONCRETE FLOOR HARDENING AGENT

FIELD

The present disclosure relates to a hardening agent, and more particularly to a concrete floor hardening agent.

BACKGROUND

A concrete floor with great hardness and great compressive strength has advantages of being sturdy and durable, and thus, is widely used in the field of civil engineering as a construction material. Despite having such advantages, the concrete floor would still be inevitably damaged due to the impact of external factors, e.g., rain erosion, etc., and thus, protective measure is required to improve the service life of the concrete floor. In order to solve the aforesaid problem, at present, those skilled in the art generally adopt use of a concrete floor hardener to improve the concrete floor.

Conventional concrete floor hardening agents include silicate, anti-permeability agents, wetting and dispersing agents, stabilizers, and water. Examples of the silicate include lithium silicate, sodium silicate, and potassium silicate. Examples of the anti-permeability agent include, but are not limited to, polysiloxane emulsion and sodium methyl silicate.

Although silicate can be used to improve properties of the concrete floor, both sodium silicate and potassium silicate have poor permeability, which merely enable the surface of the concrete floor to have a certain degree of hardness, and abrasion resistance of the concrete floor would decrease after long term use. In addition, although lithium silicate has a permeability greater than those of sodium silicate and potassium silicate, such compound incurs a high cost.

SUMMARY

Therefore, an object of the present disclosure is to provide a concrete floor hardening agent that can alleviate at least one of the drawbacks of the prior art.

According to the present disclosure, the concrete floor hardening agent includes an aluminate, a waterproofing agent, and water. The aluminate is selected from the group consisting of sodium aluminate and potassium aluminate, and is present in an amount ranging from 15 wt % to 65 wt % based on 100 wt % of the concrete floor hardening agent. The waterproofing agent is selected from the group consisting of potassium methyl silicate, sodium methyl silicate, silicone oil, and siloxane, and is present in an amount ranging from 5 wt % to 20 wt % based on 100 wt % of the concrete floor hardening agent.

BRIEF DESCRIPTION OF THE DRAWINGS

Other features and advantages of the present disclosure will become apparent in the following detailed description of the embodiment(s) with reference to the accompanying drawings. It is noted that various features may not be drawn to scale.

DETAILED DESCRIPTION

Figure 1:
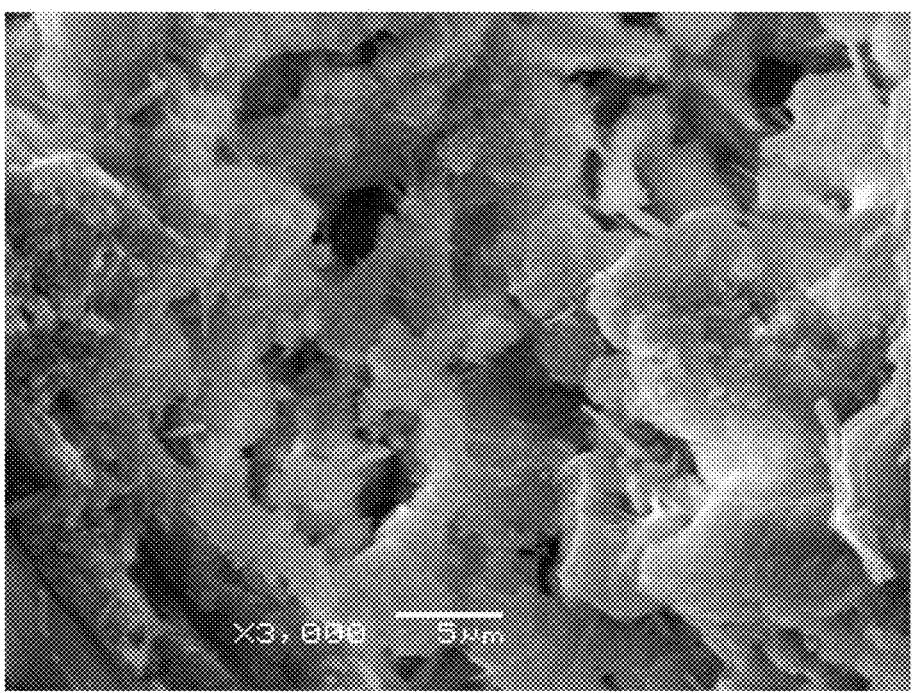
FIG. 1 is a scanning electron microscope (SEM) image illustrating a treated concrete floor after application of a concrete floor hardening agent of Example 1.
Figure 2:
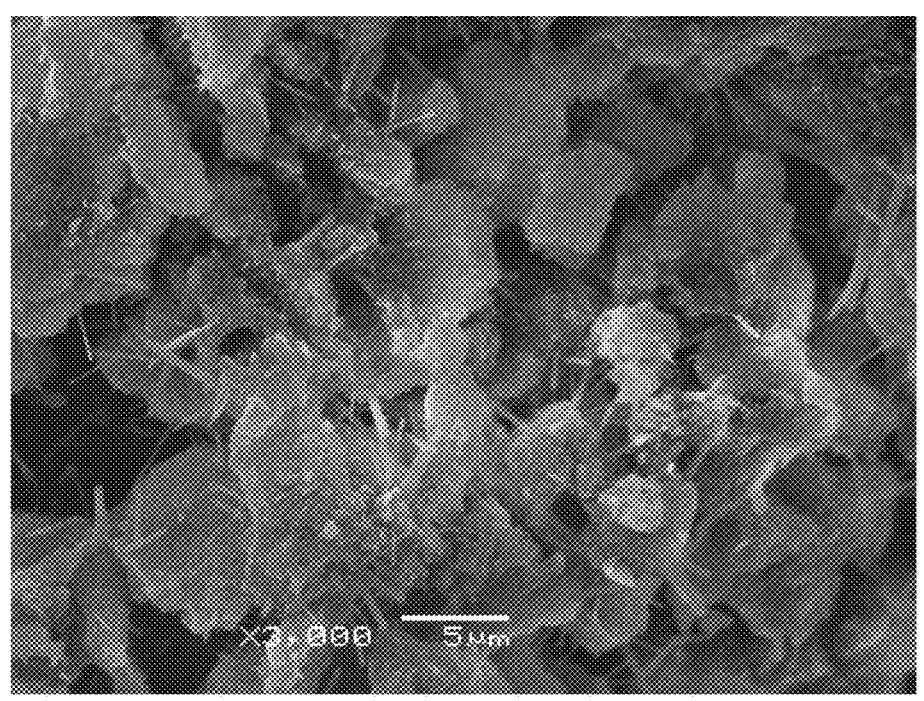
FIG. 2 is an SEM image illustrating a treated concrete floor after application of a concrete floor hardening agent of Example 2.
Figure 3:
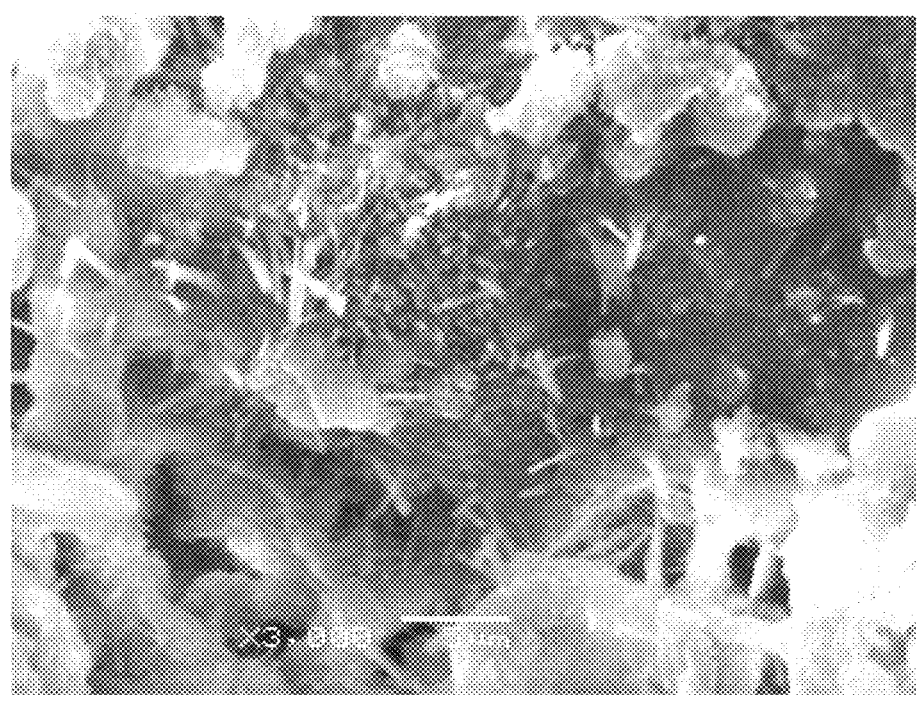
FIG. 3 is an SEM image illustrating a treated concrete floor after application of a concrete floor hardening agent of Example 3.
Figure 4:
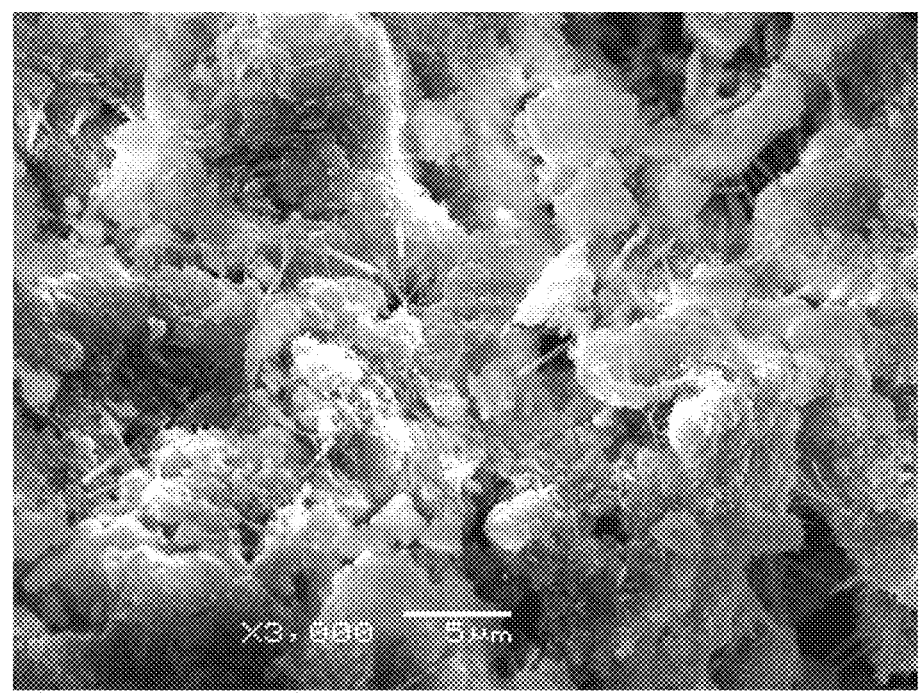
FIG. 4 is an SEM image illustrating a treated concrete floor after application of a concrete floor hardening agent of Example 4.
Figure 5:
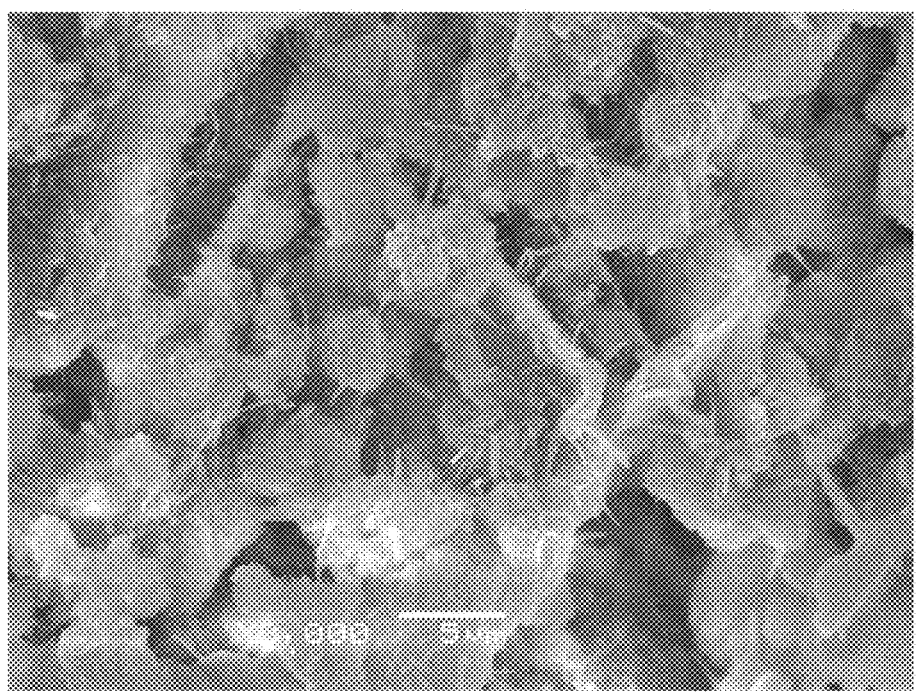
FIG. 5 is an SEM image illustrating a treated concrete floor after application of a concrete floor hardening agent of Example 7.
Figure 6:
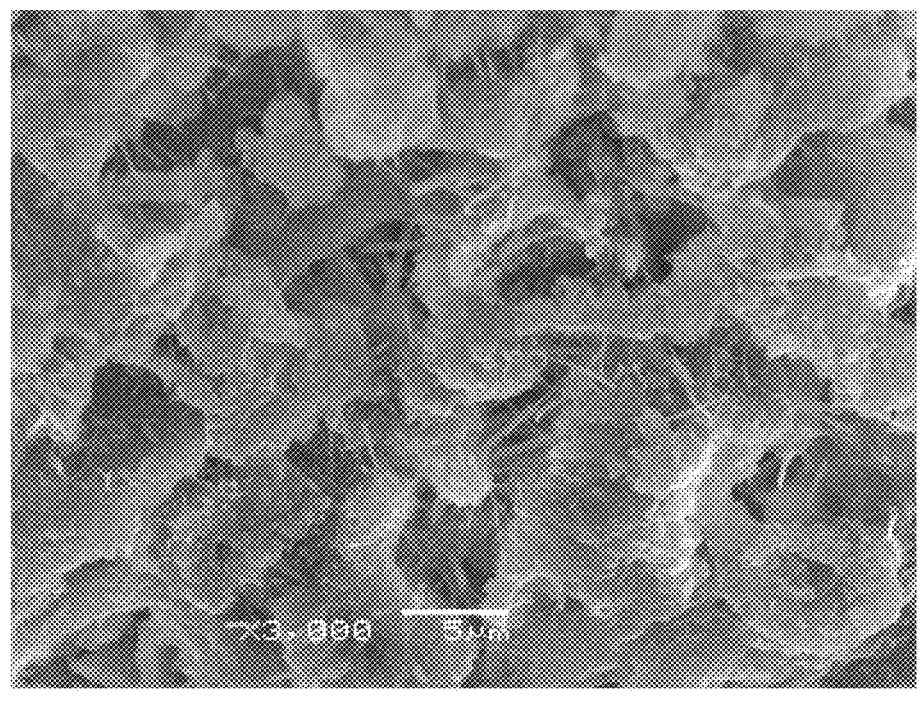
FIG. 6 is an SEM image illustrating a treated concrete floor after application of a concrete floor hardening agent of Example 8.
Figure 7:
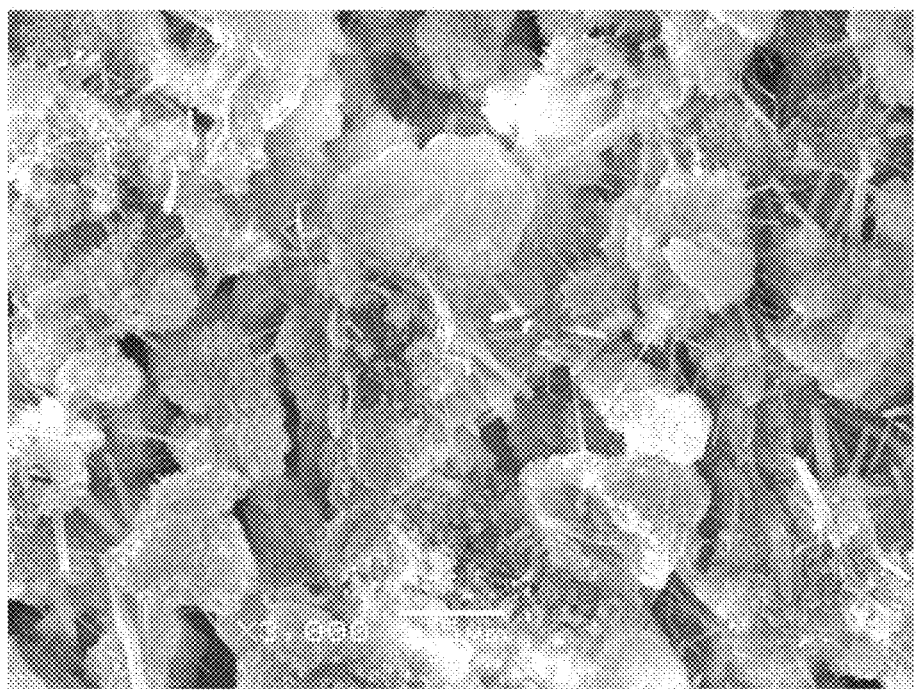
FIG. 7 is an SEM image illustrating a treated concrete floor after application of a concrete floor hardening agent of Example 9.
Figure 8:
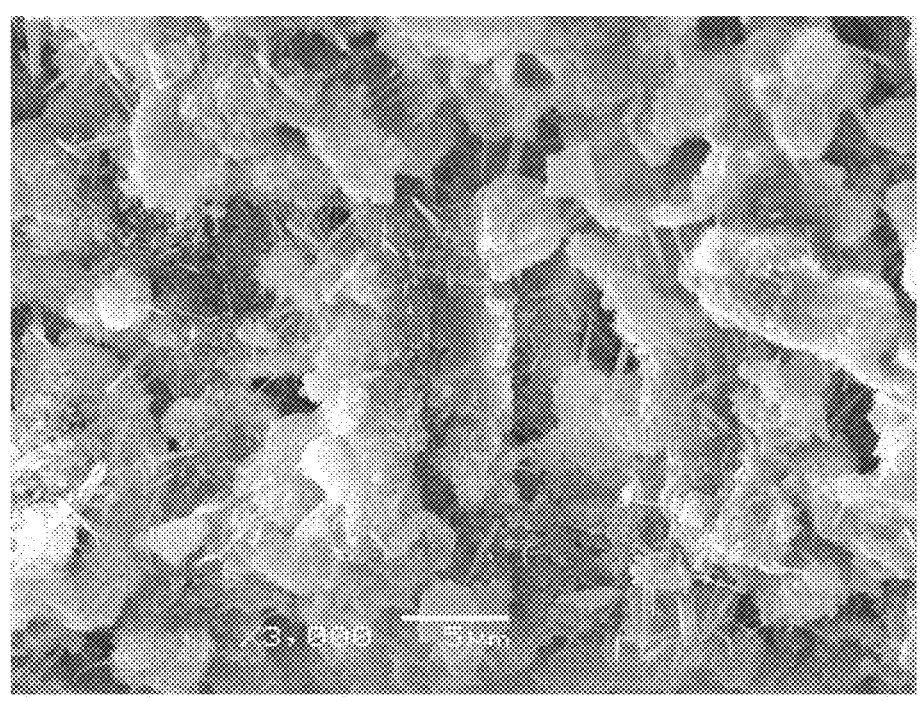
FIG. 8 is an SEM image illustrating a treated concrete floor after application of a concrete floor hardening agent of Example 10.
Figure 9:
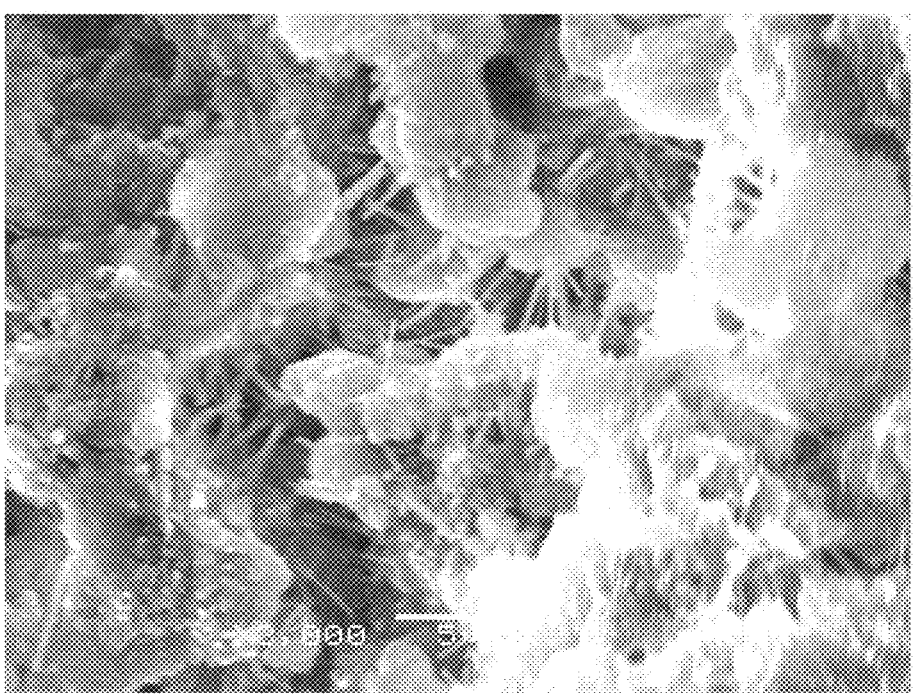
FIG. 9 is an SEM image illustrating a treated concrete floor after application of a concrete floor hardening agent of Example 11.
Figure 10:
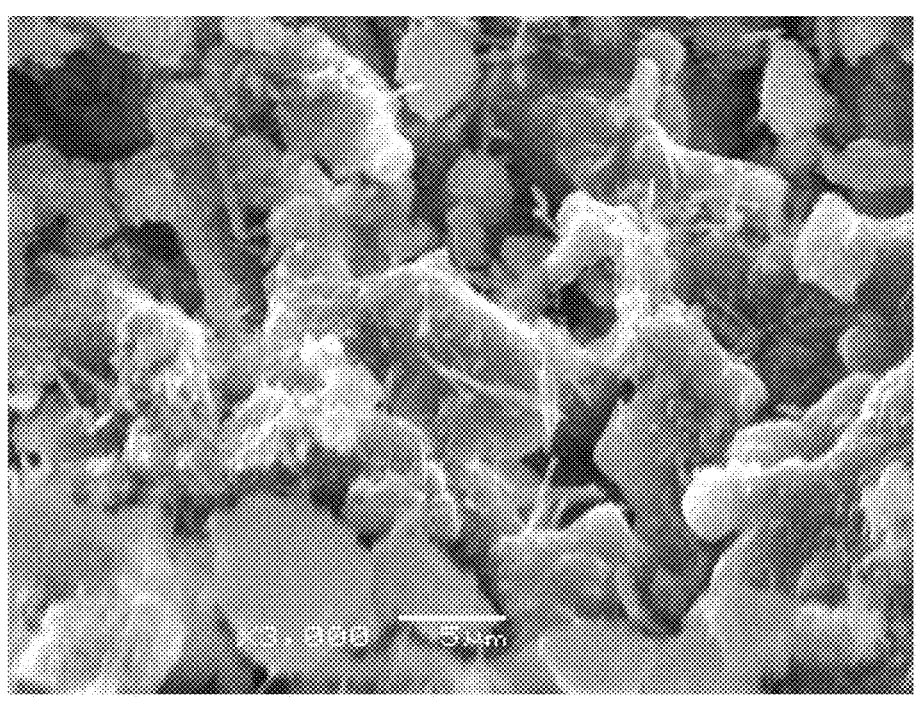
FIG. 10 is an SEM image illustrating a treated concrete floor after application of a concrete floor hardening agent of Example 13.
Figure 11:
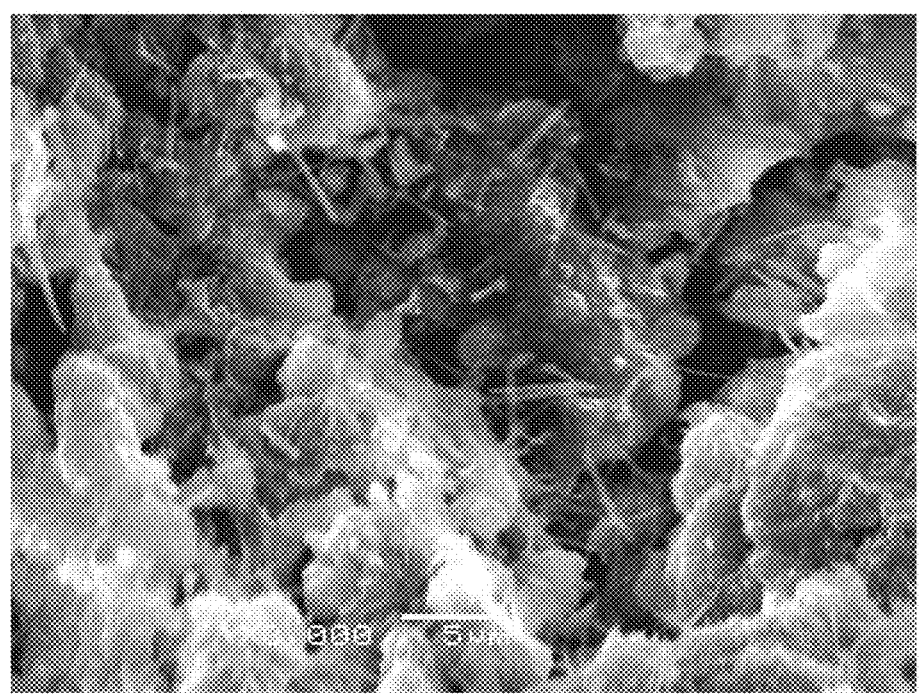
FIG. 11 is an SEM image illustrating a treated concrete floor after application of a concrete floor hardening agent of Example 16.
Figure 12:
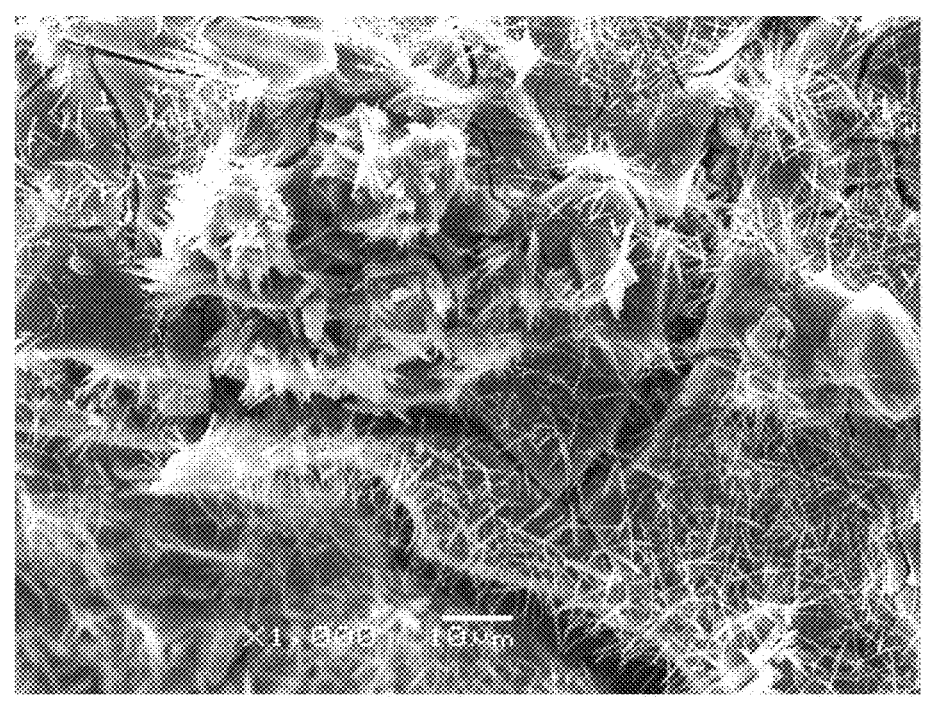
FIG. 12 is an SEM image illustrating a treated concrete floor after application of a concrete floor hardening agent of Comparative Example 1.
Figure 13:
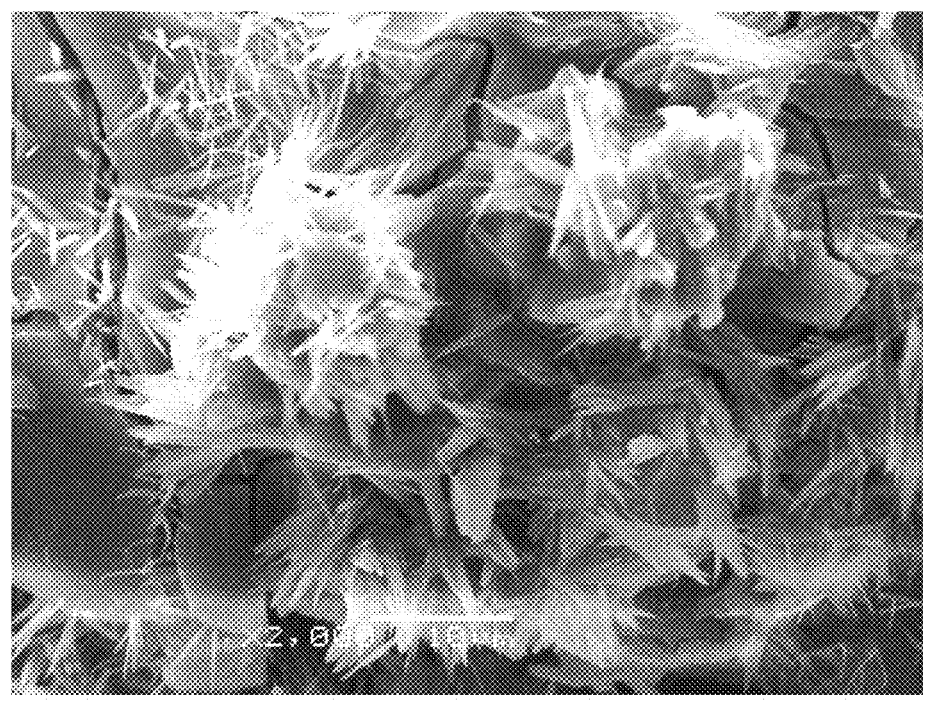
FIG. 13 is an SEM image illustrating a treated concrete floor after application of a concrete floor hardening agent of Comparative Example 2.

Before the present disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

The present invention provides a concrete floor hardening agent which includes an aluminate, a waterproofing agent, and water. Examples of the aluminate may include sodium aluminate and potassium aluminate.

In certain embodiments, the aluminate is present in an amount ranging from 15 wt % to 65 wt % based on 100 wt % of the concrete floor hardening agent. In certain embodiments, the aluminate is present in an amount ranging from 15 wt % to 60 wt % based on 100 wt % of the concrete floor hardening agent.

In certain embodiments, the aluminate has a particle size ranging from 100 nm to 200 nm. In certain embodiments, the aluminate has a particle size ranging from 30 nm to 100 nm.

Examples of the waterproofing agent may include, but are not limited to, potassium methyl silicate, sodium methyl silicate, silicone oil, and siloxane. Examples of the siloxane may include, but are not limited to, methyl siloxane and polysiloxane resin. In certain embodiments, the waterproofing agent may be selected from the group consisting of potassium methyl silicate, sodium methyl silicate, silicone oil, and siloxane. In certain embodiments, the waterproofing agent is present in an amount ranging from 5 wt % to 20 wt % based on 100 wt % of the concrete floor hardening agent.

In certain embodiments, the concrete floor hardening agent may further include a wetting agent. In certain embodiments, the wetting agent is present in an amount ranging from 0.5 wt % to 1.0 wt % based on 100 wt % of the concrete floor hardening agent. Examples of the wetting agent may include, but are not limited to, a polysaccharide-based wetting agent, an organosilicon surfactant, and an alkoxylated surfactant. An example of the polysaccharide-based wetting agent may include, but not limited to, a polysaccharide-based wetting agent purchased from An Fong Development Co., Ltd. and having a product number of SW-401. Examples of the organosilicon surfactant may include, but are not limited to, an organosilicon surfactant purchased from BASF Co. Ltd. and having a product number of Hydropalat® WE 3120, and another organosilicon surfactant purchased from BASF Co. Ltd. and having a product number of Hydropalat® WE 3189. Examples of the alkoxylated surfactant may include, but are not limited to, an alkoxylated surfactant purchased from BASF Co. Ltd. and having a product number of Hydropalat® SL 3682, and another alkoxylated surfactant purchased from BASF Co. Ltd. and having a product number of Efka® SL 3259.

When the concrete floor hardening agent is applied to the concrete floor, the sodium ions or potassium ions of the aluminate of the concrete floor hardening agent would react (i.e., an ion exchange reaction) with the calcium ions of calcium hydroxide [$Ca(OH)_2$] on the surface of the concrete floor to form free calcium ions, such that the aluminate ions of the aluminate can react with the free calcium ions to form plate-shaped calcium aluminate hydrate. To be specific, the aluminate ions of the aluminate permeate into an interior portion of the concrete floor through pores of the concrete floor, and react with the free calcium ions at the interior portion to form the plate-shaped calcium aluminate hydrate which fills the pores of the concrete floor, thereby improving hardness of the resultant treated concrete floor, and imparting a relatively high abrasion resistance to the treated concrete floor.

In addition, after application of the concrete floor hardening agent, the surface of the treated concrete floor may be further subjected to at least one of a grinding treatment and a polishing treatment.

In certain embodiments, the grinding treatment may be conducted using a water grinder (Manufacturer: Concria) including resin-bonded diamonds with different abrasiveness, such as #100 water grinder, #200 water grinder, #400 water grinder, #800 water grinder, etc. When the surface of the treated concrete floor is subjected to the grinding treatment several times, different sizes of the water grinding discs are used.

In certain embodiments, the polishing treatment may be, for example, a high speed polishing treatment conducted using a polishing pad.

The present disclosure will be described by way of the following examples. However, it should be understood that the following examples are intended solely for the purpose of illustration and should not be construed as limiting the present disclosure in practice.

Preparation of Concrete Floor Hardening Agent

Example 1 (EX1)

Based on a total weight of a concrete floor hardening agent, 30 wt % of sodium aluminate having a particle size ranging from 30 nm to 100 nm, 10 wt % of potassium methyl silicate, 0.5 wt % of polysaccharide-based wetting agent (Manufacturer: An Fong Development Co., Ltd.; Product number: SW-401) and a balance of water were mixed at a temperature ranging from 25° C. to 30° C., so as to obtain a concrete floor hardening agent of Example 1 (EX1).

Examples 2 to 17 (EX2 to EX17) and Comparative Examples 1 and 2 (CE1 and CE2)

The procedures for preparing the concrete floor hardening agents of Examples 2 to 17 (EX2 to EX17) and Comparative Examples 1 and 2 (CE1 and CE2) were similar as those of Example 1, except that, in EX2 to EX17 and CE1 and CE2, the type and amount of the each component were changed, as shown in Tables 1 to 3 below.

Property Evaluation of Treated Concrete Floor

1. Mohs Scale of Mineral Hardness

The concrete floor hardening agents of EX1 to EX17 and CE1 and CE2 were respectively applied to concrete floors each having a thickness of 10 cm and a Mohs hardness of 2, so as to obtain treated concrete floors of EX1 to EX17 and CE1 and CE2. Then, each of the treated concrete floor was subjected to measurement of Mohs scale of mineral hardness using procedures set forth in the Methods of test for ceramic tiles of the National Standards CNS 3299 of the Republic of China (published in 2006).

2. Depth of Permeability

The concrete floor hardening agents of EX1 to EX17 and CE1 and CE2 were respectively applied to concrete floors each having a thickness of 10 cm, so as to obtain treated concrete floors of EX1 to EX17 and CE1 and CE2. Next, a surface of each of the treated concrete floors was cut downwardly, followed by use of energy-dispersive X-ray spectroscopy to analyze whether compositions of cross-sectional areas at different depths contain calcium aluminate. Thereafter, a scanning electron microscope (Manufacturer: JEOL; Model no: JSM-6360) was used to capture microscopic images of the cross-sectional areas at different depths, and the depths containing calcium aluminate was recorded. The microscopic image of the concrete floor (before application of the concrete floor hardening agent) was shown in FIG. 14, while the microscopic images of the treated concrete floors after application of the concrete floor hardening agents of EX1 to EX4, EX7 to EX11, EX13, EX16, CE1 and CE2 were shown in FIGS. 1 to 13, respectively.

3. Abrasion Loss and Percentage of Reduction of Abrasion

The concrete floor hardening agents of EX1 to EX17 and CE1 and CE2 were respectively applied to concrete floors each having a thickness of 10 cm and an abrasion depth of 10.7 mm, so as to obtain treated concrete floors of EX1 to EX17 and CE1 and CE2. Then, each of the treated concrete floors was subjected to measurement of abrasion depth using procedures set forth in the Methods of abrasion test for building materials and part of building construction (abrasive paper method) of the National Standards CNS 10785 of the Republic of China (published in 1984), under a load of 500 g and a revolution number of 1000. The percentage of reduction of abrasion of the respective one of the treated concrete floor of EX1 to EX17 and CE1 and CE2 was calculated using the following Equation (I):

$$A = [(B - C) \div C] \times 100\% \tag{1}$$

where A=percentage of reduction of abrasion (%)
B=abrasion depth of concrete floor (i.e., 10.7 g)
C=abrasion loss of treated concrete floor

TABLE 1

| Concrete floor hardening agent | | EX1 | EX2 | EX3 | EX4 | EX5 | EX6 |
|---|---|---|---|---|---|---|---|
| Aluminate | Sodium aluminate (wt %) | 30 | 0 | 0 | 0 | 0 | 0 |
| | Potassium aluminate (wt %) | 0 | 30 | 15 | 60 | 10 | 65 |
| | Particle size (nm) | | | 30 to 100 | | | |
| | Total amount (wt %) | 30 | 30 | 15 | 60 | 10 | 65 |
| Silicate | Sodium silicate (wt %) | 0 | 0 | 0 | 0 | 0 | 0 |
| | Potassium silicate (wt %) | 0 | 0 | 0 | 0 | 0 | 0 |
| Waterproofing agent | Potassium methyl silicate (wt %) | 10 | 10 | 10 | 10 | 10 | 10 |
| | Silicone oil (wt %) | 0 | 0 | 0 | 0 | 0 | 0 |
| | Methylsiloxane (wt %) | 0 | 0 | 0 | 0 | 0 | 0 |
| Wetting agent | Polysaccharide-based wetting agent (wt %) | 0.5 | 0.5 | 0.5 | 0.5 | 0.5 | 0.5 |
| | Water (wt %) | 59.5 | 59.5 | 74.5 | 29.5 | 79.5 | 24.5 |
| | pH value | 12.8 | 14.1 | 12.5 | 14.5 | 12.3 | 15.2 |
| Property evaluation of treated concrete floor | Mohs scale of mineral hardness | 5 | 6 | 5 | 5 | 5 | 5 |
| | Abrasion loss (g) | 4.3 | 2.9 | 3.6 | 3.6 | 5.6 | 4.8 |
| | Percentage of reduction of abrasion (%) | 59.8 | 72.9 | 66.4 | 66.4 | 47.7 | 55.1 |
| | Depth of permeability (mm) | 8 | 10 | 9 | 8 | 7 | 7 |

TABLE 2

| Concrete floor hardening agent | | EX7 | EX8 | EX9 | EX10 | EX11 | EX12 |
|---|---|---|---|---|---|---|---|
| Aluminate | Sodium aluminate (wt %) | 30 | 30 | 30 | 30 | 0 | 0 |
| | Potassium aluminate (wt %) | 30 | 0 | 0 | 0 | 30 | 30 |
| | Particle size (nm) | | | 30 to 100 | | | |
| | Total amount (wt %) | 60 | 30 | 30 | 30 | 30 | 30 |
| Silicate | Sodium silicate (wt %) | 0 | 0 | 0 | 0 | 0 | 0 |
| | Potassium silicate (wt %) | 0 | 0 | 0 | 0 | 0 | 0 |
| Waterproofing agent | Potassium methyl silicate (wt %) | 10 | 10 | 0 | 0 | 5 | 4 |
| | Silicone oil (wt %) | 0 | 0 | 10 | 0 | 0 | 0 |
| | Methylsiloxane (wt %) | 0 | 0 | 0 | 10 | 0 | 0 |
| Wetting agent | Polysaccharide-based wetting agent (wt %) | 0.5 | 0 | 0 | 0 | 0.5 | 0.5 |
| | Water (wt %) | 29.5 | 60 | 60 | 60 | 64.5 | 65.5 |
| | pH value | 13.5 | 13.9 | 13.9 | 13.9 | 13.9 | 13.9 |
| Property evaluation of treated concrete floor | Mohs scale of mineral hardness | 5 | 5 | 5 | 5 | 5 | 5 |
| | Abrasion loss (g) | 3.7 | 3.3 | 3.5 | 4.0 | 3.7 | 4.5 |
| | Percentage of reduction of abrasion (%) | 65.4 | 69.2 | 67.3 | 62.6 | 65.4 | 57.9 |
| | Depth of permeability (mm) | 8 | 9 | 9 | 8 | 8 | 7 |

TABLE 3

| Concrete floor hardening agent | | EX13 | EX14 | EX15 | EX16 | EX17 | CE1 | CE2 |
|---|---|---|---|---|---|---|---|---|
| Aluminate | Sodium aluminate (wt %) | 0 | 0 | 0 | 0 | 0 | 0 | 0 |
| | Potassium aluminate (wt %) | 30 | 30 | 30 | 30 | 30 | 0 | 0 |
| | Particle size (nm) | | | 30 to 100 | | | | |
| | Total amount (wt %) | 30 | 30 | 30 | 30 | 30 | 0 | 0 |
| Silicate | Sodium silicate (wt %) | 0 | 0 | 0 | 0 | 0 | 30 | 0 |
| | Potassium silicate (wt %) | 0 | 0 | 0 | 0 | 0 | 0 | 30 |
| Waterproofing agent | Potassium methyl silicate (wt %) | 20 | 22 | 10 | 10 | 10 | 10 | 10 |
| | Silicone oil (wt %) | 0 | 0 | 0 | 0 | 0 | 0 | 0 |
| | Methylsiloxane (wt %) | 0 | 0 | 0 | 0 | 0 | 0 | 0 |
| Wetting agent | Polysaccharide-based wetting agent (wt %) | 0.5 | 0.5 | 0.3 | 1.0 | 1.2 | 0.5 | 0.5 |
| | Water (wt %) | 49.5 | 47.5 | 59.7 | 59.0 | 58.8 | 59.5 | 59.5 |
| | pH value | 13.9 | 13.9 | 13.9 | 13.9 | 13.9 | 12.5 | 13.3 |

TABLE 3-continued

| Concrete floor hardening agent | | EX13 | EX14 | EX15 | EX16 | EX17 | CE1 | CE2 |
|---|---|---|---|---|---|---|---|---|
| Property evaluation of treated concrete floor | Mohs scale of mineral hardness | 5 | 5 | 5 | 5 | 5 | 3 | 3 |
| | Abrasion loss (g) | 3.9 | 4.5 | 5.1 | 3.1 | 5.0 | 7.4 | 6.9 |
| | Percentage of reduction of abrasion (%) | 63.6 | 57.9 | 52.3 | 71.0 | 53.3 | 30.8 | 35.5 |
| | Depth of permeability (mm) | 8 | 7 | 7 | 10 | 7 | 3 | 5 |

Figure 14:
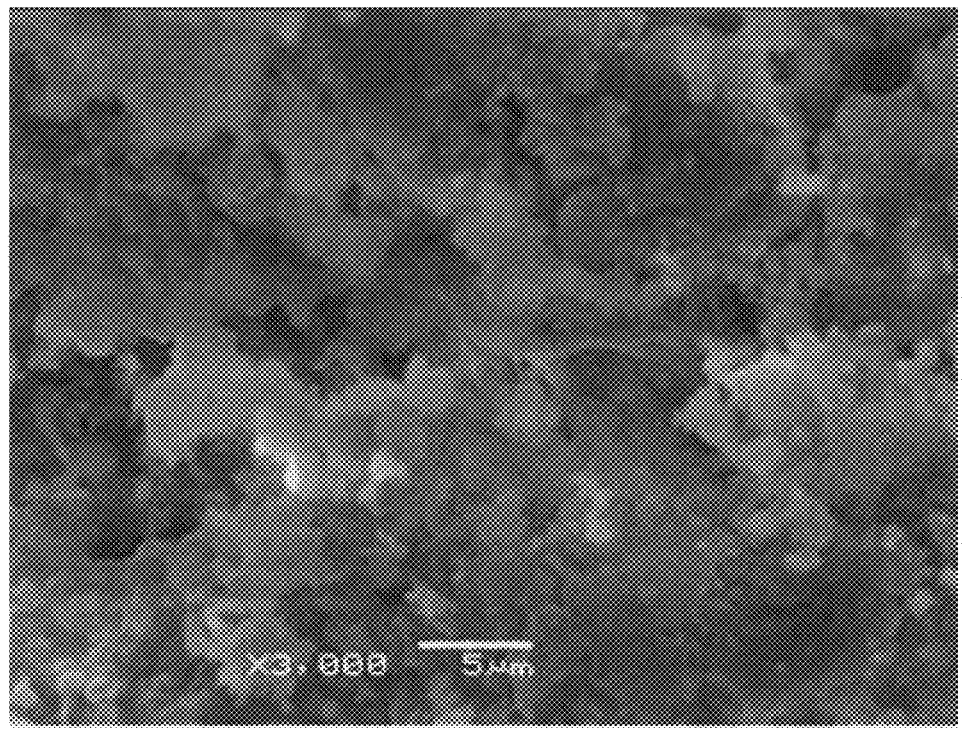
FIG. 14 is an SEM image illustrating a concrete floor before application of a concrete floor hardening agent.

FIG. 14 is a microscopic image of the concrete floor before application of the concrete floor hardening agent. Referring to FIGS. 1 to 11, after application of the concrete floor hardening agent of the present disclosure, the thus obtained treated concrete floor contains plate-shaped calcium aluminate hydrate. In contrast, referring to FIGS. 12 and 13, after application of the concrete floor hardening agent including silicate, the thus obtained treated concrete floor contains needle-shaped (i.e., acicular) or fibrous-shaped calcium aluminate hydrates. Since those skilled in the art know that a plate-shaped material has a strength that is greater than that of a needle-shaped or fibrous-shaped material, the treated concrete floor containing plate-shaped calcium aluminate hydrate has a high abrasion resistance after application of the concrete floor hardening agent including aluminate of the present disclosure.

The experimental results in Tables 1 to 3 show that, in comparison with the percentage of reduction of abrasion and the depth of permeability of the treated concrete floors after application of the concrete floor hardening agent including silicate, each of the treated concrete floors, after application of the concrete floor hardening agent including aluminate of the present disclosure, has a greater percentage of reduction of abrasion and a greater depth of permeability, indicating that the concrete floor hardening agent including aluminate of the present disclosure can permeate deeper into the concrete floor and imparts a greater abrasion resistance to the treated concrete floors.

To be specific, the concrete floor without being applied with the concrete floor hardening agent had a Mohs scale of mineral hardness of 2, the concrete floors after being applied with the concrete floor hardening agents of EX1 to EX17 each had a Mohs scale of mineral hardness of 5 or 6, and the concrete floors after being applied with the concrete floor hardening agents of CE1 and CE2 each had a Mohs scale of mineral hardness of 3 or 4. These results indicate that in comparison with the concrete floor without being applied with the concrete floor hardening agent, the Mohs scale of mineral hardness of the concrete floor after being applied with the concrete floor hardening agents of EX1 to EX17 increased by 3 to 4; however, the Mohs scale of mineral hardness of the concrete floor after being applied with the concrete floor hardening agents of CE1 and CE2 merely increased by 1 to 2.

In addition, the concrete floor without being applied with the concrete floor hardening agent had an abrasion loss of 10.7 g, the concrete floors after being applied with the concrete floor hardening agents of EX1 to EX17 each had an abrasion loss ranging from 2.9 g to 5.6 g, and the concrete floors after being applied with the concrete floor hardening agents of CE1 and CE2 each had an abrasion loss ranging from 6.9 g to 7.4 g. These results indicate that in comparison with the concrete floor hardening agents of CE1 and CE2, the concrete floor hardening agents of EX1 to EX17 can indeed effectively reduce the abrasion loss of the treated concrete floor, thereby imparting an excellent abrasion resistance to the same.

In summary, by inclusion of aluminate in the concrete floor hardening agent of the present disclosure, when the concrete floor hardening agent is applied to the concrete floor, the aluminate ions of the aluminate of the concrete floor hardening agent can react with the calcium ions on the surface of the concrete floor, and can permeate into an interior portion of the concrete floor through pores of the concrete floor to react with the calcium ions at the interior portion so as to form plate-shaped calcium aluminate hydrate which fills the pores of the concrete floor, thereby improving hardness of the resultant treated concrete floor, and imparting a relatively high abrasion resistance to the treated concrete floor.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:
1. A concrete floor hardening agent, comprising:
an aluminate selected from the group consisting of potassium aluminate and sodium aluminate, the aluminate being present in an amount ranging from 15 wt % to 65 wt % based on 100 wt % of the concrete floor hardening agent;

a waterproofing agent selected from the group consisting of potassium methyl silicate and sodium methyl silicate, the waterproofing agent being present in an amount ranging from 5 wt % to 20 wt % based on 100 wt % of the concrete floor hardening agent;

a wetting agent selected from the group consisting of a polysaccharide-based wetting agent, an organosilicon surfactant, and an alkoxylated surfactant, the wetting agent being present in an amount ranging from 0.5 wt % to 1.0 wt % based on 100 wt % of the concrete floor hardening agent; and water, wherein the aluminate has a particle size ranging from 100 nm to 200 nm.

2. The concrete floor hardening agent as claimed in claim 1, wherein the aluminate is present in an amount ranging from 15 wt % to 60 wt % based on 100 wt % of the concrete floor hardening agent.

3. The concrete floor hardening agent as claimed in claim 1, which has a pH value of greater than 12.

* * * * *